S. MARTIN.
Brick-Machines.
No. 137,460.
Patented April 1, 1873.
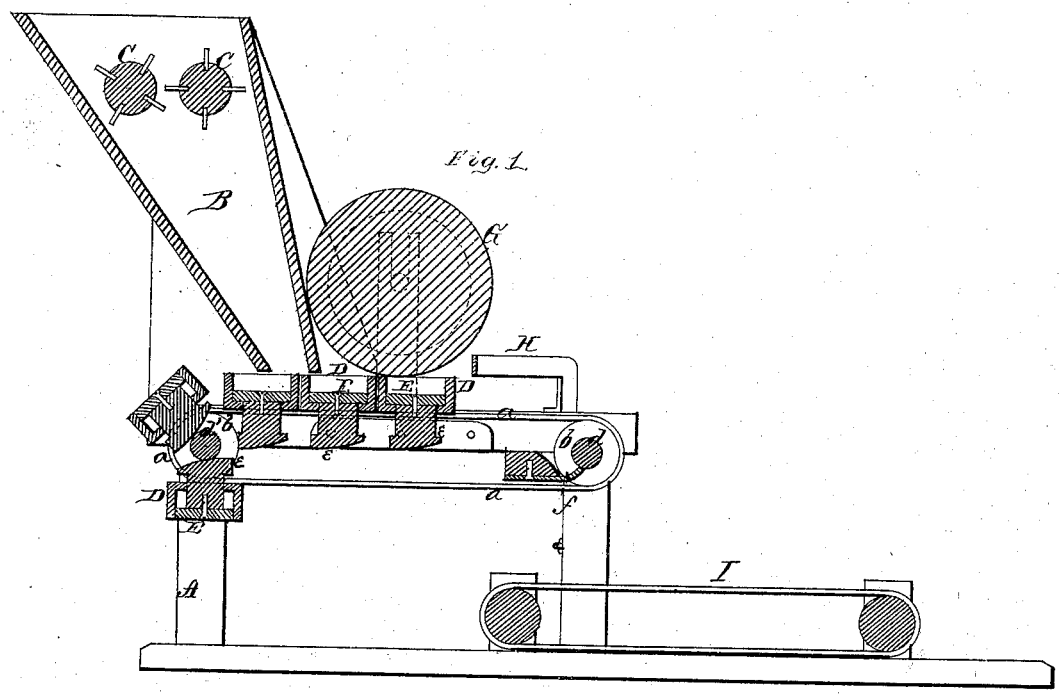
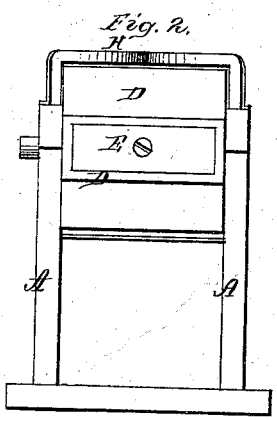

UNITED STATES PATENT OFFICE.

SAMUEL MARTIN, OF KNOBNOSTER, MISSOURI.

IMPROVEMENT IN BRICK-MACHINES.

Specification forming part of Letters Patent No. 137,460, dated April 1, 1873; application filed January 21, 1873.

*To all whom it may concern:*

Be it known that I, SAMUEL MARTIN, of Knobnoster, in the county of Johnson and State of Missouri, have invented certain new and useful Improvements in Brick-Machines; and I do hereby declare that the following is a full, clear, and exact description thereof, that will enable others skilled in the art to which it appertains to make and use the same, reference being had to the accompanying drawing and to the letters of reference marked thereon, which form a part of this specification.

The nature of my invention consists in the construction and arrangement of a brick-machine, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my machine, and Fig. 2 is a partial front elevation of the same.

A represents the frame of my machine, upon which is secured the hopper B. Within the hopper B are two revolving spiked or toothed cylinders, C C, for agitating the clay and forcing it down through the hopper, at the lower end of which it is deposited in the molds D D. These molds are attached to two horizontal endless belts, $a$ $a$, passing over pulleys $b$ $b$ placed upon two shafts, $d$ and $d'$, as shown in Fig. 1. Each mold D is provided with a movable bottom, E, from which a shoe, $e$, extends downward. As each mold emerges from under the hopper a heavy roller, G, packs the clay in the mold, said roller being capable of yielding upward. The clay is then, as the mold advances, scraped off and leveled on top by an angular knife or scraper, H, after which the mold turns around the shaft $d$, and there the shoe $e$ meets a beveled or inclined projection, $f$, which causes the bottom E to move outward to the outer edge of the mold, depositing the brick on an endless traveling apron, I, underneath. When the mold turns the other shaft, $d'$, the bottom falls down again to receive more clay.

Having thus fully described my invention, what I claim as new, and desire to secure by Letters Patent, is—

The combination and arrangement of the hopper B, with stirrers C, molds D E $e$, belt $a$ $b$ $d$ $d'$, projection $f$, roller G, and knife H, all constructed and arranged as and for the purpose specified.

In testimony that I claim the foregoing I have hereunto set my hand.

SAMUEL MARTIN.

Witnesses:
 MOSES V. FAIRCLOTH,
 ARTHUR GREEN.